(12) United States Patent
El-Khatib et al.

(10) Patent No.: US 10,293,819 B1
(45) Date of Patent: May 21, 2019

(54) AUTONOMOUS ROADWAY MERGE ASSIST SYSTEM

(71) Applicant: TRW Automotive U.S. LLC, Livonia, MI (US)

(72) Inventors: Hassan M. El-Khatib, Farmington Hills, MI (US); Gregory O. Lynch, Southfield, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 0 days.

(21) Appl. No.: 15/846,263

(22) Filed: Dec. 19, 2017

(51) Int. Cl.
*B60W 30/09* (2012.01)
*G08G 1/16* (2006.01)
*B60W 10/18* (2012.01)
*B60W 10/06* (2006.01)
*B60W 10/20* (2006.01)
*B60W 50/14* (2012.01)

(52) U.S. Cl.
CPC .......... *B60W 30/09* (2013.01); *B60W 10/06* (2013.01); *B60W 10/18* (2013.01); *B60W 10/20* (2013.01); *B60W 50/14* (2013.01); *G08G 1/166* (2013.01); *G08G 1/167* (2013.01); *B60W 2050/143* (2013.01); *B60W 2420/42* (2013.01); *B60W 2550/30* (2013.01); *B60W 2710/0605* (2013.01); *B60W 2710/18* (2013.01); *B60W 2710/20* (2013.01); *B60W 2750/308* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 7,102,496 B1* | 9/2006 | Ernst, Jr. | .......... | G08G 1/096725 180/167 |
| 2008/0125972 A1* | 5/2008 | Neff | .......... | B60W 40/02 701/300 |
| 2011/0184605 A1* | 7/2011 | Neff | .......... | G05D 1/0231 701/25 |
| 2015/0149017 A1* | 5/2015 | Attard | .......... | B60W 30/182 701/23 |
| 2015/0166062 A1* | 6/2015 | Johnson | .......... | B60W 30/12 701/41 |
| 2017/0160745 A1* | 6/2017 | Lauffer | .......... | G01S 13/931 |
| 2017/0297576 A1* | 10/2017 | Halder | .......... | B60W 30/18109 |
| 2017/0369055 A1* | 12/2017 | Saigusa | .......... | G08G 1/096791 |
| 2018/0319403 A1* | 11/2018 | Buburuzan | .......... | B62D 15/0255 |
| 2018/0373245 A1* | 12/2018 | Nishi | .......... | G05D 1/0088 |
| 2019/0012550 A1* | 1/2019 | Nix | .......... | G06K 9/00805 |

* cited by examiner

*Primary Examiner* — Tyler D Paige
(74) *Attorney, Agent, or Firm* — Tarolli, Sundheim, Covell & Tummino L.L.P.

(57) ABSTRACT

A system for autonomously assisting the operation of a host vehicle traveling on a first lane of a roadway includes at least one camera assembly for detecting the presence and speed of a vehicle merging into the first lane. A proximity sensor monitors the distance between the host vehicle and the merging vehicle. A controller electrically is connected to the at least one camera assembly and the proximity sensor and, in response to receiving signals from the at least one camera assembly and the proximity sensor, actuates a steering gear to laterally move the host vehicle from the first lane to a second lane of the roadway to allow the merging vehicle to enter the first lane.

20 Claims, 5 Drawing Sheets

AUTONOMOUS ROADWAY MERGE ASSIST SYSTEM

TECHNICAL FIELD

The present invention relates generally to vehicle assist systems and, more specifically, relates to a system for helping a host vehicle navigate around a vehicle merging onto a roadway.

BACKGROUND

Current driver assistance systems (ADAS—advanced driver assistance system) offer a series of monitoring functions in vehicles. In particular, the ADAS can monitor the environment around the vehicle and notify the driver of the vehicle of conditions therein. To this end, the ADAS can capture images of the surrounding environment and digitally process the images to extract information. The later information is used to warn the driver of road obstacles located along the driving path. Common ADAS systems include automatic emergency braking (AEB) to help prevent rear-end collision and adaptive cruise control (ACC) to help mitigate pre-set vehicle speed to keep a safe distance from a following vehicle. ADAS systems can also include lane detection (LD) to help maintain the vehicle within the intended driving lane.

SUMMARY

In one aspect of the present invention, a method for autonomously assisting the operation of a host vehicle traveling on a first lane of a roadway includes detecting the location and speed of a vehicle merging into the first lane. The host vehicle is laterally moved from the first lane to a second lane autonomously in response to the detected location and speed of the merging vehicle.

In another aspect of the invention, a system for autonomously assisting the operation of a host vehicle traveling on a first lane of a roadway includes at least one camera assembly for detecting the presence and speed of a vehicle merging into the first lane. A proximity sensor monitors the distance between the host vehicle and the merging vehicle. A controller is connected to the at least one camera assembly and the proximity sensor and, in response to receiving signals from the at least one camera assembly and the proximity sensor, actuates a steering gear to laterally move the host vehicle from the first lane to a second lane of the roadway to allow the merging vehicle to enter the first lane.

Other objects and advantages and a fuller understanding of the invention will be had from the following detailed description and the accompanying drawings.

DETAILED DESCRIPTION

Figure 1:
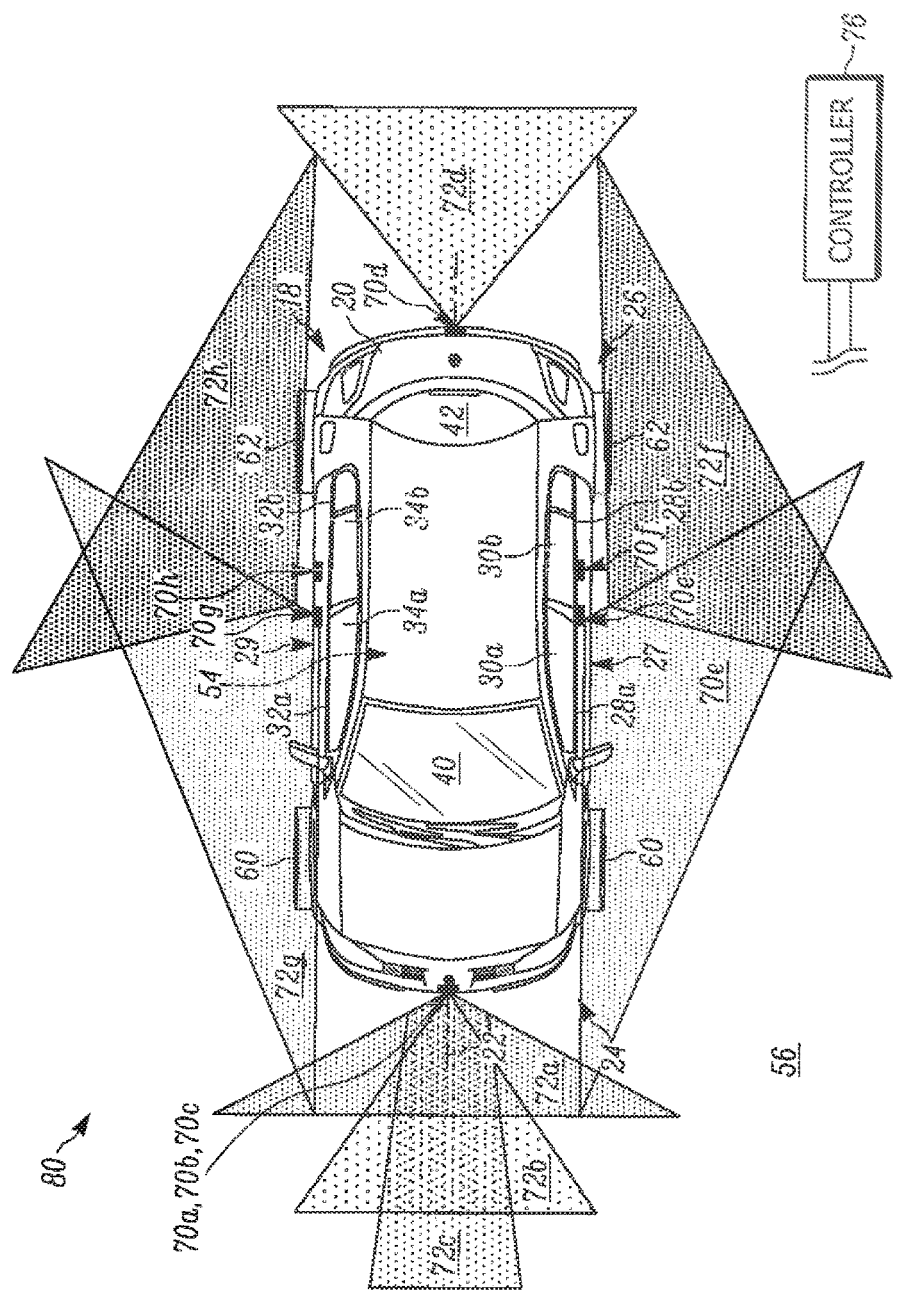
FIG. 1 is a top view of a host vehicle having an assist system in accordance with an embodiment of the present invention.

The present invention relates generally to vehicle assist systems and, more specifically, relates to a system for helping a host vehicle navigate around a vehicle merging onto a roadway. FIG. 1 illustrates a host vehicle 20 having an assist system 80 in accordance with an embodiment of the present invention.

The vehicle 20 extends along a centerline 22 from a front end 24 to a rear end 26. The vehicle 20 includes a left side 27 and a right side 29 positioned on opposite sides of the centerline 22. The left side 27 includes a pair of doors 28a, 28b each having an associated window 30a, 30b. The right side 29 includes a pair of doors 32a, 32b each having an associated window 34a, 34b.

The front end 24 of the vehicle 20 includes a front window or windshield 40 extending generally between the left and right sides 27, 29. The rear end 26 of the vehicle 20 includes a rear window 42 extending generally between the left and right sides 27, 29. The windows 30a, 30b, 32a, 32b, 40, 42 and doors 28a, 28b, 32a, 32b collectively help define an interior 54 of the vehicle 20. The exterior of the vehicle 20 is indicated generally at 56.

The vehicle 20 includes a pair of front steerable wheels 80 and a pair of rear wheels 62. The front wheels 60 are mechanically linked to a steering actuator or gear 68 (see FIG. 2), which is mechanically linked to a steering wheel 66. Alternatively, the front wheels 62 and steering wheel 66 could be part of a steer-by-wire system (not shown). The rear wheels 62 could also be coupled to the steering wheel 66 by the same steering gear 68 or another steering gear (not shown).

In any case, rotation of the steering wheel 66 actuates the steering gear 68 to turn the wheels 60 relative to the centerline 22 in order to steer the host vehicle 20. To this end, the steering wheel 66 has a neutral position in which the wheels 60 point in directions that are parallel to the centerline 22 such that the host vehicle moves in a straight line. Counterclockwise rotation of the steering wheel 66 angles the wheels 60 leftward relative to the centerline 22 (as shown in FIG. 1), causing the host vehicle 20 to turn left. Clockwise rotation of the steering wheel 66 angles the wheels 60, 62 rightward relative to the centerline 22, causing the host vehicle 20 to turn right.

The assist system 80 includes a surround view system 18 for capturing images of the host vehicle exterior 56. The surround view system 18 includes camera assemblies 70a-70h provided around the periphery of the host vehicle 20. As shown, camera assemblies 70a-70c are secured to the front end 24 of the host vehicle 20 along or adjacent to the centerline 22. A camera assembly 70d is secured to the rear end 26 of the host vehicle 20 along or adjacent to the centerline 22. A pair of camera assemblies 70e-70f is secured to the left side 27. A pair of camera assemblies 70g-70h is secured to the right side 29. All the camera assemblies 70a-70h face outward away from the host vehicle 20. It will be appreciated that more or fewer camera assemblies can be provided. In any case, all of the camera assemblies 70a-70h are electrically or wirelessly connected to a controller 76 in the host vehicle 20.

Each camera assembly 70a-70h has an associated field of view 72a-72h covering a portion of the host vehicle exterior 56. Collectively, the fields of view 72a-72h encircle the entire vehicle 20 and overlap one another. The controller 76 continuously receives images taken by the camera assemblies 70a-70h within the respective fields of view 72a-72h. The controller 76 includes an image processing module (not shown) that receives and analyzes the data associated with the images from the camera assemblies 70a-70h. The controller 76 can, for example, stitch the images together to form a 360° surround view (not shown) of the vehicle exterior 56. The images can also be relied on to identify objects around the vehicle 20.

Figure 2:
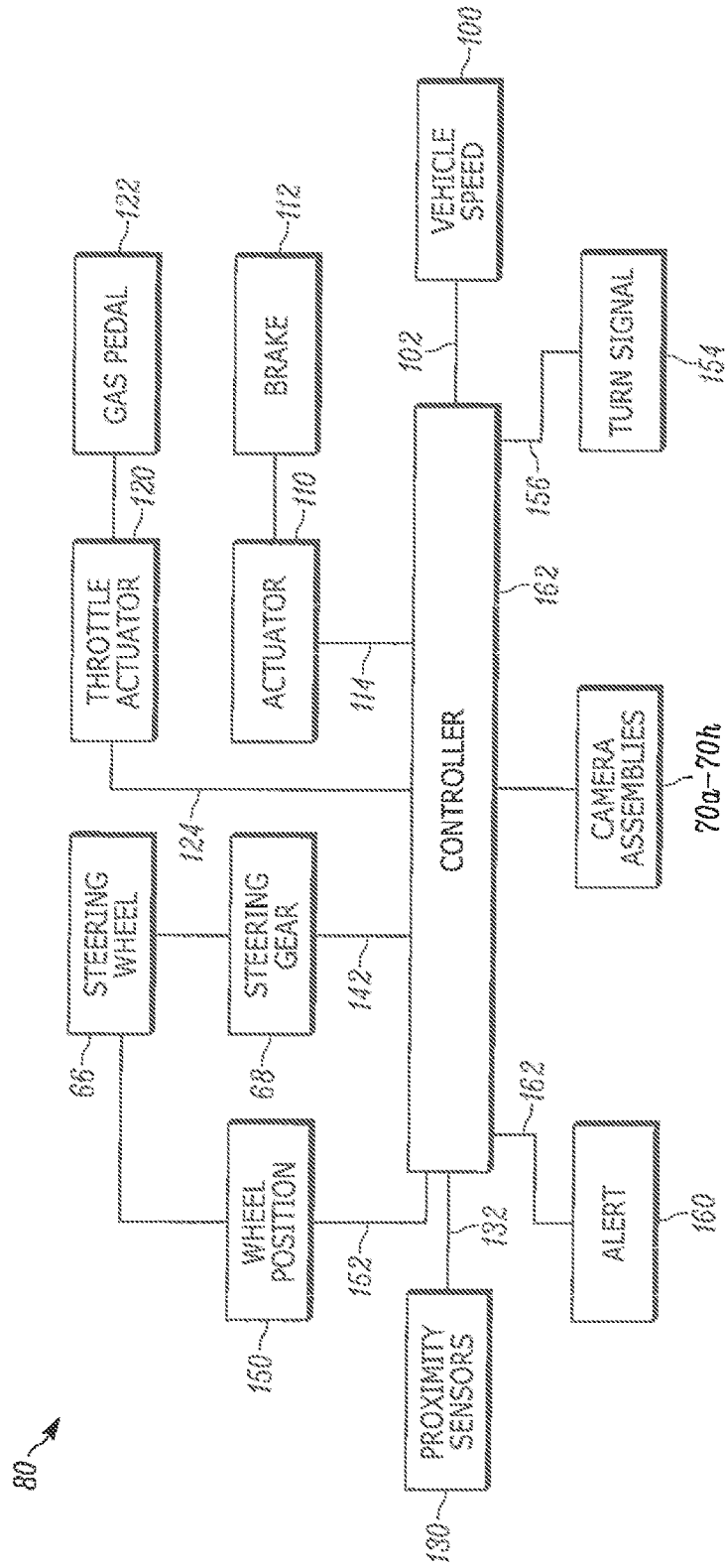
FIG. 2 is a schematic Illustration of the assist system of FIG. 1.

Referring to FIG. 2, the controller 76 is also electrically or wirelessly connected with various sensors and actuators in the vehicle 20 for monitoring and controlling several functions of the vehicle, namely, vehicle speed and steering. To this end, the controller 76 is electrically or wirelessly connected to a vehicle speed sensor 100. The speed sensor 100 monitors the vehicle speed and generates an electrical signal 102 indicative thereof that is sent to the controller 76 at predetermined time intervals.

The controller 76 is also electrically or wirelessly connected to an actuator 110 associated with the vehicle brake 112 and a throttle actuator 120 associated with the gas pedal 122. The controller 76 can send a control signal 114 to the brake actuator 110 to decrease the vehicle 20 speed. The controller 76 can send a control signal 124 to the throttle actuator 120 to increase the vehicle 20 speed.

A wheel position sensor 150 monitors the rotational angle of the steering wheel 66 and generates an electrical signal 152 indicative of the steering angle. The signal 152 is sent to the controller 76 at predetermined time intervals. The controller 76 can send a control signal 142 to the steering gear 68 in response to the wheel position signal 152, thereby controlling rotation of the steering wheel 66. The steering gear 68 actuation also controls the steering angle of the front wheels 60 relative to the centerline 22 of the host vehicle 20.

At least one proximity sensor 130 is electrically or wirelessly connected to the controller 76 for acquiring data related to objects around the vehicle exterior 56. The at least one proximity sensor 130 can include, for example, laser scanners, ultrasonic sensors, radar detectors, and LIDAR detectors, for determining and monitoring the distance between the vehicle 20 and objects around the vehicle exterior 56 detected by the camera assemblies 70a-70h.

Based on this construction, the controller 76 is capable of receiving continuous feedback regarding the driving conditions of the vehicle, e.g., vehicle speed and steering angle, images around the vehicle exterior 56. and the distance between the vehicle and objects identified in the images. The controller 76, in response to these inputs, is capable of controlling vehicle operation in a manner that helps increase occupant safety. More specifically, the controller 76 is capable of autonomously controlling the host vehicle 20 position (lateral motion) and/or speed (longitudinal motion) in response to detecting a merging vehicle.

A turn signal 154 constituting a lever or button is electrically or wirelessly connected to the controller 76 for notifying other vehicles when the host vehicle 20 intends to changes lanes 202, 204 or move onto/off the roadway 200. To this end, the controller 76 automatically sends a signal 156 to the turn signal 154 before and/or while the host vehicle 20 laterally moves along, onto or off the roadway 200. In response, the turn signal 154 will actuate fights (not shown) on the host vehicle 20 indicating the intended direction of lateral movement of the host vehicle.

An alert 160 is electrically or wirelessly connected to the controller 76 for providing feedback to the operator of the host vehicle 20 before and/or while autonomous operations are performed by the assist system 80. The alert 160 provides visual, audio or haptic feedback to the operator before and/or when the controller 76 sends a signal 162 thereto.

Figure 3:
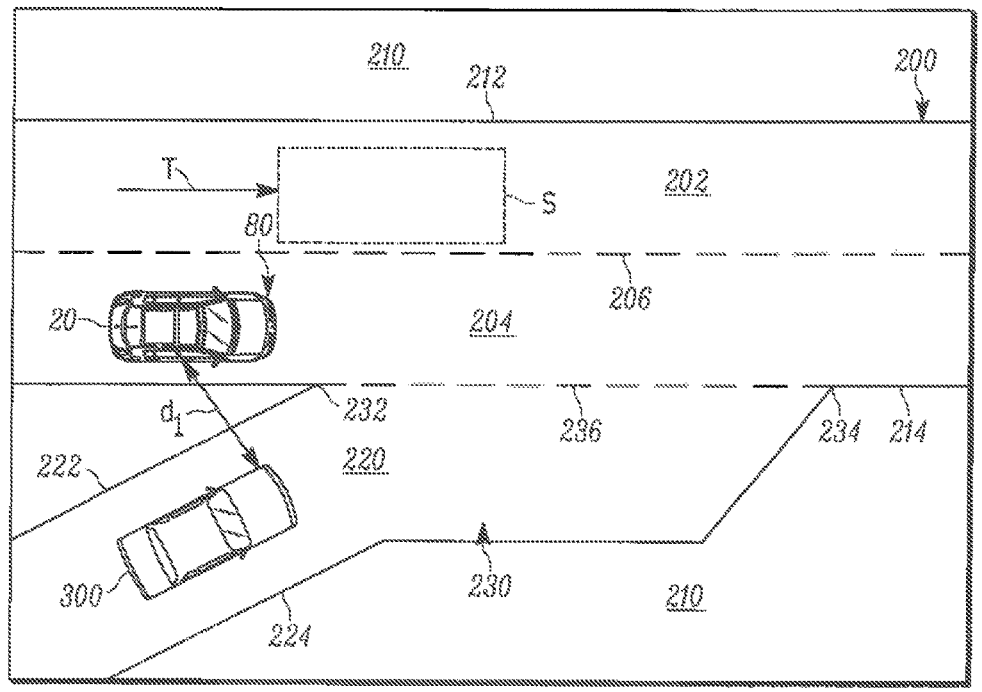
FIG. 3 is a schematic illustration of the host vehicle traveling in a first lane of a roadway.

In one example, the assist system 80 helps the host vehicle 20 avoid impacts with other vehicles merging onto a roadway 200. An example roadway 200 is shown in FIG. 3 and has a direction of vehicle travel illustrated by the arrow T. The roadway 200 includes a series of lanes 202, 204 separated by a dashed dividing line 206. Additional lanes and dividing lines are contemplated but not shown. The roadway 200 is separated from the surrounding off-road terrain 210 by a boundary line 212 on the left side (relative to the traveling direction T) and by a boundary line 214 on the right side.

In normal driving parlance, the leftmost lane—here the lane 202—in the direction of travel T is commonly dedicated as the express lane for passing slower moving vehicle in lanes to the right—here only the lane 204. In fact, certain state laws make it illegal to use the leftmost lane for purposes other than passing slow moving vehicles. That said, it is desirable to limit the amount of time the vehicle 20 spends in the lane 202 when not passing other vehicles on the roadway 200.

An on-ramp 220 approaches the roadway 200 from the right side. It will be appreciated that the on-ramp 220 could alternatively be located on the left side of the roadway 200. In either case, the on-ramp 220 is initially defined from the roadway 200 and from the surrounding off-road terrain 210 by boundary lines 222, 224. The on-ramp 200 is angled relative to the roadway 200 so as to gradually direct traffic traveling on the on-ramp to the roadway along a merging portion 230. To this end, the boundary line 222 gradually converges to the boundary line 214 of the roadway 200 until intersecting the boundary line 214 at a location indicated at 232. The boundary line 224 gradually converges to the boundary line 214 of the roadway 200 until intersecting the boundary line 214 at a location indicated at 234. The location 234 is further down the roadway 200 from the location 232, with the distance therebetween defining the length of the merging portion 230. A dividing line 236 extends between the locations 232, 234 to demarcate the lane 204 from the merging portion 230.

FIG. 3 illustrates a scenario in which the vehicle 20 travels within the lane 204 adjacent to the on-ramp 220 in the direction T. A merging vehicle 300 is shown approaching the vehicle 20 on its right-hand side from the on-ramp 220. The merging vehicle 300 needs to transition into the roadway 200 before reaching the intersection point 234 to successfully merge with traffic along the roadway 200. Since the vehicle 20 is in the lane 204 into which the merging vehicle 300 merges, and the lane 204 extends adjacent to the dividing line 236, it is desirable for the vehicle 20 to temporarily switch to the lane 202 to facilitate traffic flow and avoid a possible collision with the merging vehicle 300.

The controller 76 determines both when a merging vehicle 300 is present on the on-ramp 220 and the speed of the merging vehicle based on images received from the camera assemblies 70a-70h. The images can also be used to determine the angle at which the merging vehicle 300 approaches the vehicle 20. The controller 76 relies on the proximity sensors 130 and/or camera assembles 70a-70h to determine and monitor a distance $d_1$ between the vehicle 20 and the merging vehicle 300.

Using an algorithm and/or look-up table, the controller 76 determines, based on the distance $d_1$ between the vehicles 20, 300, the speed of the merging vehicle 300, and the angle at which the merging vehicle is approaching the vehicle 20, whether the vehicle should switch to the lane 202. If the controller 76 determines that lane switching is unnecessary, no further action is taken, i.e., the vehicle 20 continues moving within the lane 204 in the direction T. This can occur when the controller 76 determines that the vehicle 20 can continue traveling in the lane 204 and pass the merging vehicle 300 without preventing the merging vehicle from transitioning into the lane 204.

If, however, the controller 76 determines that lane switching is desirable, the controller takes active measures to move the vehicle leftward into the lane 202 to allow the merging vehicle 300 to transition into the lane 204. This occurs without driver intervention or assistance, i.e., the move is autonomously performed. Once the controller 76 determines that the merging vehicle 300 has completely entered the lane 204 and that the vehicle 20 is capable of moving safely back into the lane 204, the controller takes active measures to return the vehicle 20 to the lane 204.

While the determination is made by the controller 76, the assist system 80 simultaneously determines—via the camera assemblies 70*a*-70*h* and/or proximity sensors 130—whether other vehicles, objects, obstacles, etc. are present in the lane 202 before the host vehicle 20 switches lanes. If other vehicles prevent the host vehicle 20 from immediately moving laterally when desired, the controller 76 can send signals 114, 124 to the respective actuators 110, 120 to adjust the vehicle 20 speed until the lane change can be accomplished. The decision whether to adjust the vehicle 20 speed or change lanes 202, 204 is based on a series of algorithms and/or look-up tables that rely on the data acquired by the assist system 80.

To this end, the assist system 80 continuously scans the lane 202 and calculates an object-free space S into which the vehicle 20 can move without colliding with other vehicles and/or obstacles. The object-free space S is a 2-dimensional area projected onto the lane 202 whose size and shape is based on the speed and position of any surrounding vehicles or objects (not shown).

Figure 4:
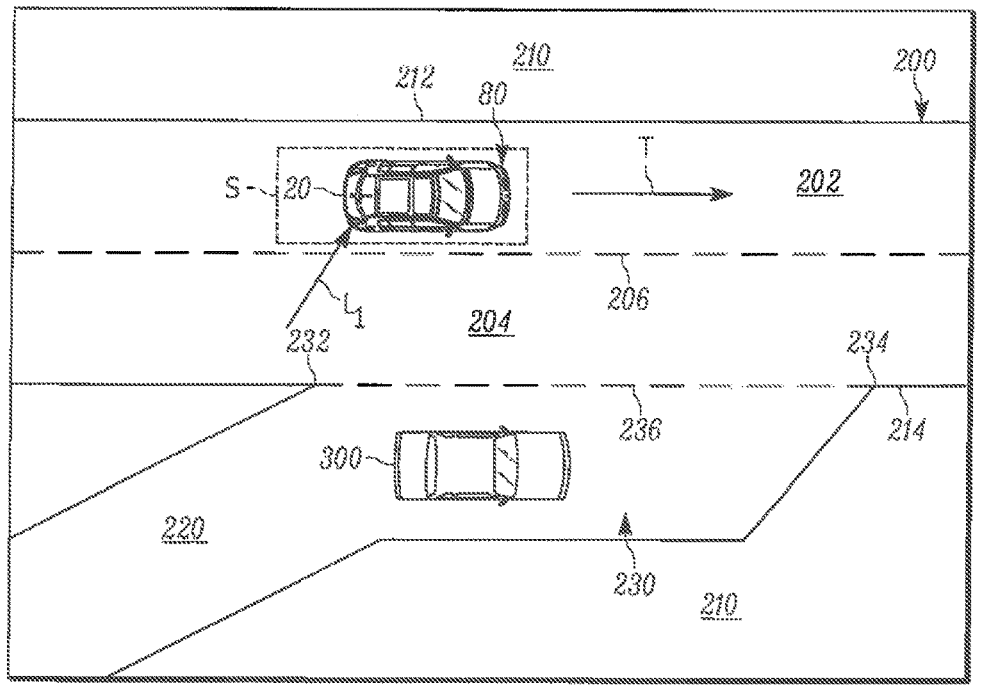
FIG. 4 is a schematic illustration of the host vehicle switching to a second lane to avoid a second, merging vehicle.

FIGS. 4-6A illustrate one example movement of the vehicle 20 between the lanes 202, 204. In FIG. 4, the controller 76 determines that the merging vehicle 300 is on the on-ramp and that switching lanes is desirable. Once the distance $d_1$ reaches the predetermined value and the object-free space S established, the controller 76 actuates the steering gear 68 to rotate the steering wheel 66 counter-clockwise from the neutral position, thereby causing the vehicle 20 to move laterally in the direction $L_1$ into the object-free space S within the lane 202.

During the lane change, the camera assemblies 70*a*-70*h* capture images of the lane line 206 and the boundary line 212 that are sent to the controller 76. The controller 76 relies on the proximity sensors 130 to monitor the distance between the vehicle 20 and each of the lines 206, 212. The wheel position sensor 150 continuously supplies electrical signals 152 to the controller 76. As a result the controller 76 can analyze the images from the camera assemblies 70*a*-70*h* and the signals 132 from the proximity sensors 130 and actuate the steering gear 68 in a manner that transitions the vehicle 20 into the lane 202 while avoiding crossing over the boundary line 212. The controller 76 ultimately returns the steering wheel 66 to the neutral position such that the vehicle 20 travels in a straight line in the lane 202 in the direction T. The controller 76 sends a signal 162 to the alert 160 to provide feedback to the operator before and/or while the vehicle 20 is automatically switched to the lane 202. At the same time, the controller 76 sends a signal 156 to the turn signal 154 to actuate lights indicative of moving laterally in the direction $L_1$.

Figure 5:
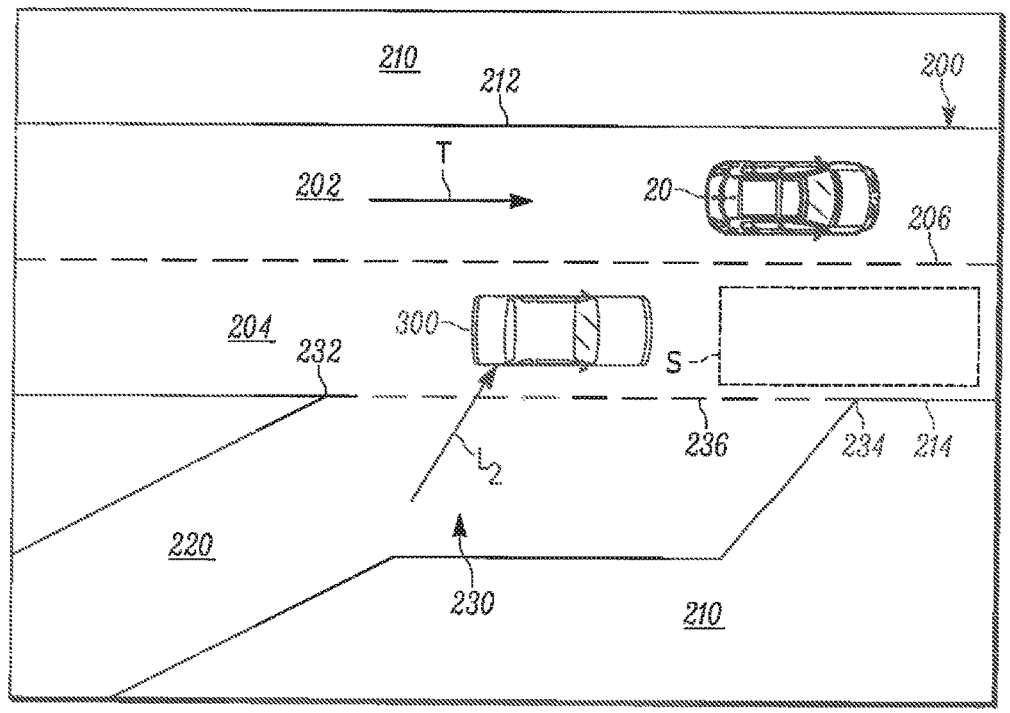
FIG. 5 is a schematic illustration of the second vehicle merging onto the roadway.

Referring to FIG. 5, with the vehicle 20 in the lane 202, the merging vehicle 200 is free to cross the boundary line 236 and transition from the merging portion 230 to the lane 204 in the direction indicated by the arrow $L_2$. The controller 76 relies on the camera assemblies 70*a*-70*h* and proximity sensors 130 to continuously monitor the position and speed of the merging vehicle 300 relative to the vehicle 20. The controller 76 then causes the vehicle 20 to switch back to the lane 204 within the predefined, object-free space S in one of several manners in response to this monitoring.

Figure 6A:
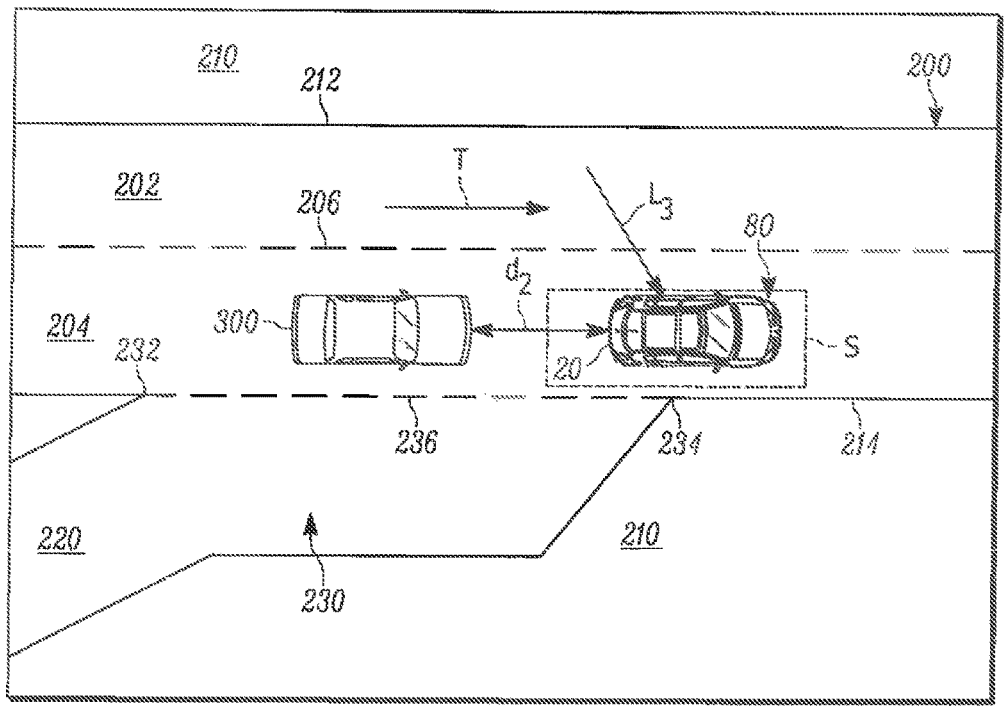
FIG. 6A is a schematic illustration of the host vehicle returning to the first lane in a position ahead of the second vehicle.

In one example shown in FIG. 6A, the controller 76 determines that it is safe to move the vehicle 20 back to the lane 204 in front of the merging vehicle 300. This determination is based on the speed and position of the merging vehicle 300 within the lane 204 as well as the speed and position of the vehicle 20 in the lane 202. To move the vehicle 20 back to the lane 204, the controller 76 actuates the steering gear 68 to rotate the steering wheel 66 clockwise from the neutral position, thereby causing the vehicle 20 to move laterally in the direction $L_3$. The host vehicle 20 moves in the direction $L_3$ into the lane 204 and ahead of the merging vehicle 300 to the predefined, object-free space S. The exact trajectory of the lateral movement $L_3$ and vehicle 20 speed are based on a determination by the controller 76 that the vehicle 20 can enter the lane 204 at least a minimum distance $d_2$ ahead of the merging vehicle to enter the object-free space S. In one example, the distance $d_2$ is configured to correspond with about a 2 second gap between the vehicles 20, 300. To this end, the controller 76 can send signals 114, 122 to the brake actuator 110 and/or to the throttle actuator 120 to control the vehicle speed in a manner that maintains the desired minimum distance $d_2$ ahead of the merging vehicle 300.

While this occurs, the camera assemblies 70*a*-70*h* capture images of the lane tine 206 and the boundary line 214 that are sent to the controller 76. The controller 76 relies on the proximity sensors 130 to monitor the distance between the vehicle 20 and each of the lines 206, 214. The wheel position sensor 150 continuously supplies electrical signals 152 to the controller 76. As a result, the controller 76 can analyze the images from the camera assemblies 70*a*-70*h* and the signals 132 from the proximity sensors 130 and actuate the steering gear 68 in a manner that transitions the vehicle 20 into the lane 204 while avoiding crossing over the boundary line 214. The controller 76 ultimately returns the steering wheel 66 to the neutral position such that the vehicle 20 travels in a straight line in the lane 204 in the direction T. The controller 76 sends a signal 162 to the alert 160 to provide feedback to the operator before and/or while the vehicle 20 is automatically returned to the lane 204. At the same time, the controller 76 sends a signal 156 to the turn signal 154 to actuate lights indicative of moving laterally in the direction $L_3$.

Figure 6B:
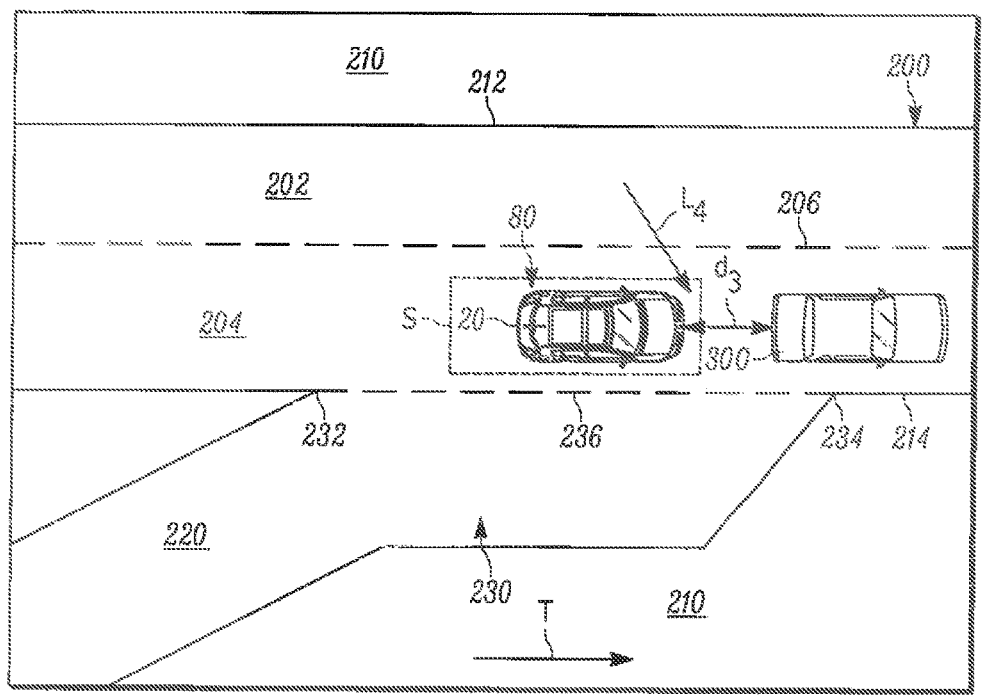
FIG. 6B is a schematic illustration of the host vehicle returning to the first lane in a position behind the second vehicle.

In another example shown in FIG. 6B, the controller 76 determines that it is safe to move the vehicle 20 back to the lane 204 behind the merging vehicle 300. This determination is based on the speed and position of the merging vehicle 300 within the lane 204 as well as the speed and position of the vehicle 20 in the lane 202. To move the vehicle 20 back to the lane 204, the controller 76 actuates the steering gear 68 to rotate the steering wheel 66 clockwise from the neutral position, thereby causing the vehicle 20 to move laterally in the manner $L_4$. The host vehicle 20 moves in the direction $L_4$ into the lane 204 and behind the merging vehicle 300 to the predefined, object-free space S. The exact trajectory of the lateral movement $L_4$ and vehicle 20 speed are based on a determination by the controller 76 that the vehicle 20 can enter the lane 204 at least the minimum distance $d_3$ behind the merging vehicle to enter the object-free space S. To this end, the controller 76 can send signals 114, 124 to the brake actuator 110 and/or to the throttle actuator 120 to control the vehicle speed in a manner that maintains at least a predetermined minimum distance $d_3$ behind the merging vehicle 300.

While this occurs, the camera assemblies 70a-70h capture images of the lane line 206 and the boundary line 214 that are sent to the controller 76. The controller 76 relies on the proximity sensors 130 to monitor the distance between the vehicle 20 and each of the lines 206, 214. The wheel position sensor 150 continuously supplies electrical signals 152 to the controller 76. As a result, the controller 76 can analyze the images from the camera assemblies 70a-70h and the signals 132 from the proximity sensors 130 and actuate the steering gear 68 in a manner that transitions the vehicle 20 into the lane 204 while avoiding crossing over the boundary line 214. The controller 76 ultimately returns the steering wheel 66 to the neutral position such that the vehicle 20 travels in a straight line in the lane 204 in the direction T. The controller 76 sends a signal 162 to the alert 160 to provide feedback to the operator before and/or while the vehicle 20 is automatically returned to the lane 204. At the same time, the controller 76 sends a signal 156 to the turn signal 154 to actuate lights indicative of moving laterally in the direction $L_4$.

The assist system of the present invention is advantageous in that the system can autonomously control the host vehicle on the roadway to allow for incoming traffic to merge without adversely affecting traffic flow. By relying on the controller and accompanying sensors—instead of solely the driver—to determine when and how the host vehicle changes lanes, the present invention can more accurately navigate the host vehicle relative to incoming traffic and increase the likelihood that safe distances between the host vehicle and other vehicles can be maintained.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for autonomously assisting the operation of a host vehicle traveling on a first lane of a roadway, comprising:
    detecting the location and speed of a vehicle merging into the first lane; and
    laterally moving the host vehicle from the first lane to a second lane in response to the detected location and speed of the merging vehicle.

2. The method recited in claim 1 further comprising:
    monitoring the location and speed of the merging vehicle in the first lane; and
    laterally moving the host vehicle back to the first lane in response to the monitored location and speed of the merging vehicle.

3. The method recited in claim 2, wherein the step of laterally moving the host vehicle back to the second lane comprises positioning the host vehicle behind the merging vehicle in response to the monitored location and speed of the merging vehicle.

4. The method recited in claim 2, wherein the step of laterally moving the host vehicle back to the second lane comprises positioning the host vehicle ahead of the merging vehicle in response to the monitored location and speed of the merging vehicle.

5. The method recited in claim 2 further comprising autonomously actuating at least one of a brake and a throttle to control the host vehicle speed in response to the monitored location and speed of the merging vehicle.

6. The method recited in claim 1 wherein the step of laterally moving the host vehicle comprises actuating a steering gear to steer wheels on the host vehicle.

7. The method recited in claim 1, wherein the host vehicle is laterally moved back to the first lane such that the host vehicle maintains a predetermined distance from the merging vehicle.

8. The method recited in claim 1 further actuating an alert connected to the controller for providing feedback to an operator of the host vehicle at least one of before and while the vehicle is laterally moved in an autonomous manner.

9. The method recited in claim 1, wherein the vehicle is merging from an on-ramp into the first lane.

10. The method recited in claim 1 further comprising autonomously actuating a turn signal to indicate the direction of lateral movement of the host vehicle.

11. The method recited in claim 1 further comprising:
    autonomously adjusting the host vehicle speed until an object-free space adjacent to the first lane is defined; and
    actuating the steering gear to laterally move the host vehicle into the object-free space.

12. A system for autonomously assisting the operation of a host vehicle traveling on a first lane of a roadway, comprising:
    at least one camera assembly for detecting the presence and speed of a vehicle merging into the first lane;
    a proximity sensor for monitoring the distance between the host vehicle and the merging vehicle; and
    a controller connected to the at least one camera assembly and the proximity sensor and, in response to receiving signals from the at least one camera assembly and the proximity sensor, actuating a steering gear to laterally move the host vehicle from the first lane to a second lane of the roadway to allow the merging vehicle to enter the first lane.

13. The system recited in claim 12, wherein the at least one camera assembly comprises a plurality of camera assemblies each having a field of view that overlap one another and collectively surrounds the host vehicle.

14. The system recited in claim 12, wherein the controller monitors the location and speed of the merging vehicle and actuates the steering gear to laterally move the host vehicle back to the first lane in response to the monitored location and speed of the merging vehicle.

15. The system recited in claim 14, wherein the controller laterally moves the vehicle back to the first lane behind the merging vehicle in response to the monitored location and speed of the merging vehicle.

16. The system recited in claim 14, wherein the controller laterally moves the vehicle back to the first lane ahead of the merging vehicle in response to the monitored location and speed of the merging vehicle.

17. The system recited in claim 12 further comprising a throttle actuator and a brake actuator both actuatable by the controller for controlling the speed of the host vehicle.

18. The system recited in claim 12, wherein the host vehicle is laterally moved to the second lane when the merging vehicle is within a predetermined distance from the host vehicle.

19. The system recited in claim 12 further comprising an alert connected to the controller for providing feedback to an operator of the host vehicle at least one of before and while the vehicle is laterally moved in an autonomous manner.

20. The system recited in claim 12, wherein the vehicle is merging from an on-ramp into the first lane.

\* \* \* \* \*